July 21, 1931.  J. T. WILKIN ET AL  1,815,639

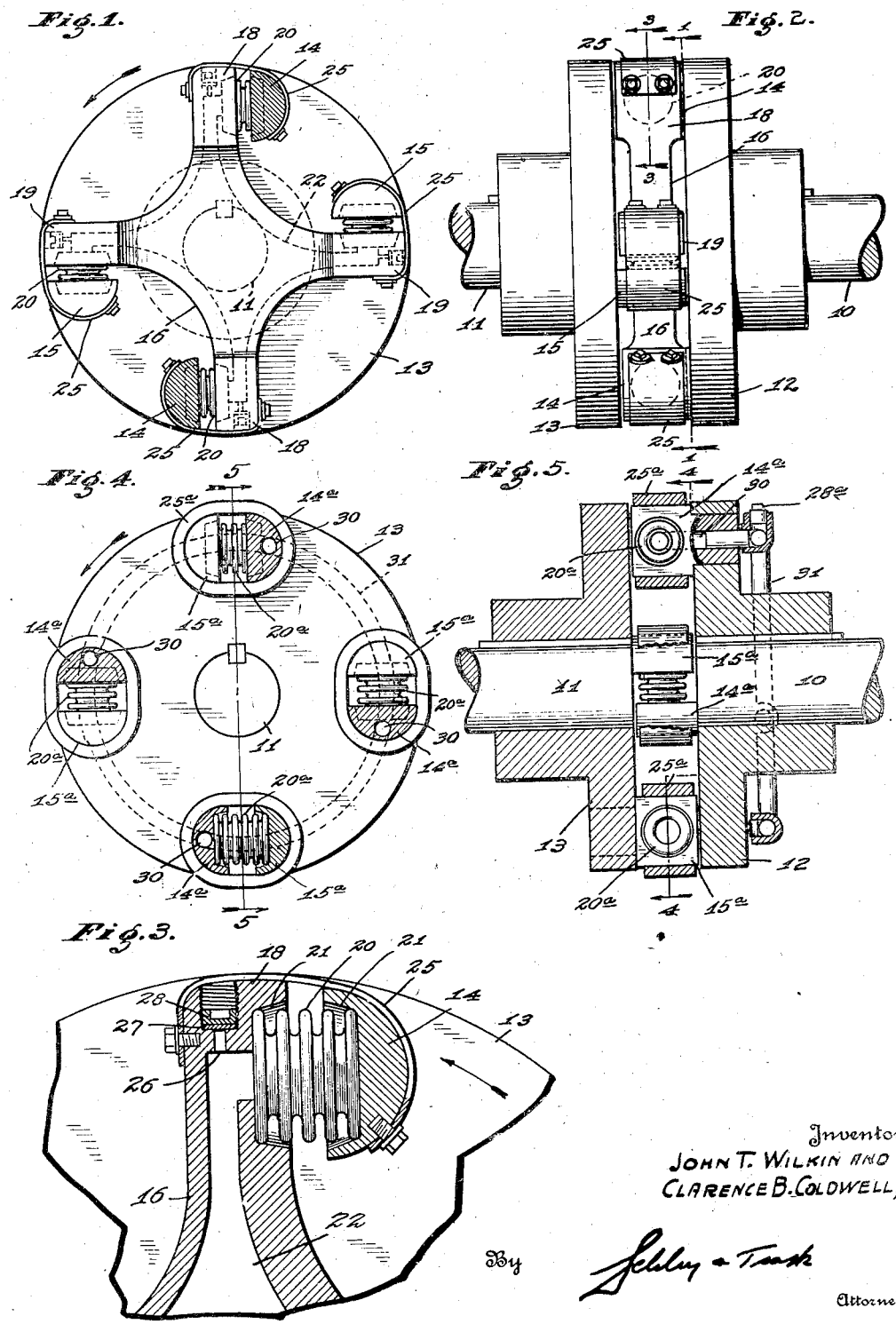

FLEXIBLE COUPLING

Filed Aug. 16, 1928  2 Sheets-Sheet 2

Inventors
JOHN T. WILKIN AND
CLARENCE B. COLDWELL,

By Schley & Tusch
Attorneys

Patented July 21, 1931

1,815,639

UNITED STATES PATENT OFFICE

JOHN T. WILKIN AND CLARENCE B. COLDWELL, OF CONNERSVILLE, INDIANA, ASSIGNORS TO THE CONNERSVILLE BLOWER COMPANY, OF CONNERSVILLE, INDIANA, A CORPORATION OF INDIANA

FLEXIBLE COUPLING

Application filed August 16, 1928. Serial No. 299,926.

It is the object of our invention to provide a flexible coupling, for the transmission of power between two rotating shafts which may be slightly out of line with each other, in which an equalization of pressure is obtained on the various arms or projections through which the flexible coupling transmits such power, and in which end thrust between the two shafts is avoided.

In carrying out our invention, we provide two main coupling members, for mounting on the adjacent ends of the two shafts which the coupling is to connect. Each of these two coupling members has a plurality of projecting arms or fingers by which it transmits power to or receives power from the other coupling member, either directly or through a third and intermediate coupling member which has co-operating projecting arms or fingers, with a balancing of forces about the shaft axes to avoid side pressures on the shafts and bearings. Between the respectively interacting arms or projections of the coupling members, whether there are only two main members or an intermediate member in addition to the two main members we provide expansible, compressible, and flexible fluid-containing chambers, desirably of the bellows or diaphragm type; and interconnect these various fluid-containing chambers so that fluid pressure in all those through which power is transmitted from one coupling member to another for a given direction of rotation will be equalized as those fluid-containing chambers expand or are compressed in the action of the coupling. The several fluid-containing chambers through which power is transmitted from one coupling member to another for a given direction of rotation normally have simultaneously a similar action in transmitting such power, and that simultaneously similar action is equalized by such interconnections, so that the unbalancing effect due to misalinement of the two shafts which are being connected is minimized and to a large extent prevented. The fluid used to fill these fluid-containing chambers and their interconnecting passages is desirably a liquid, because of the substantial incompressibility of liquids; but, if preferred, a gas or vapor may be used as such fluid.

Figure 6:
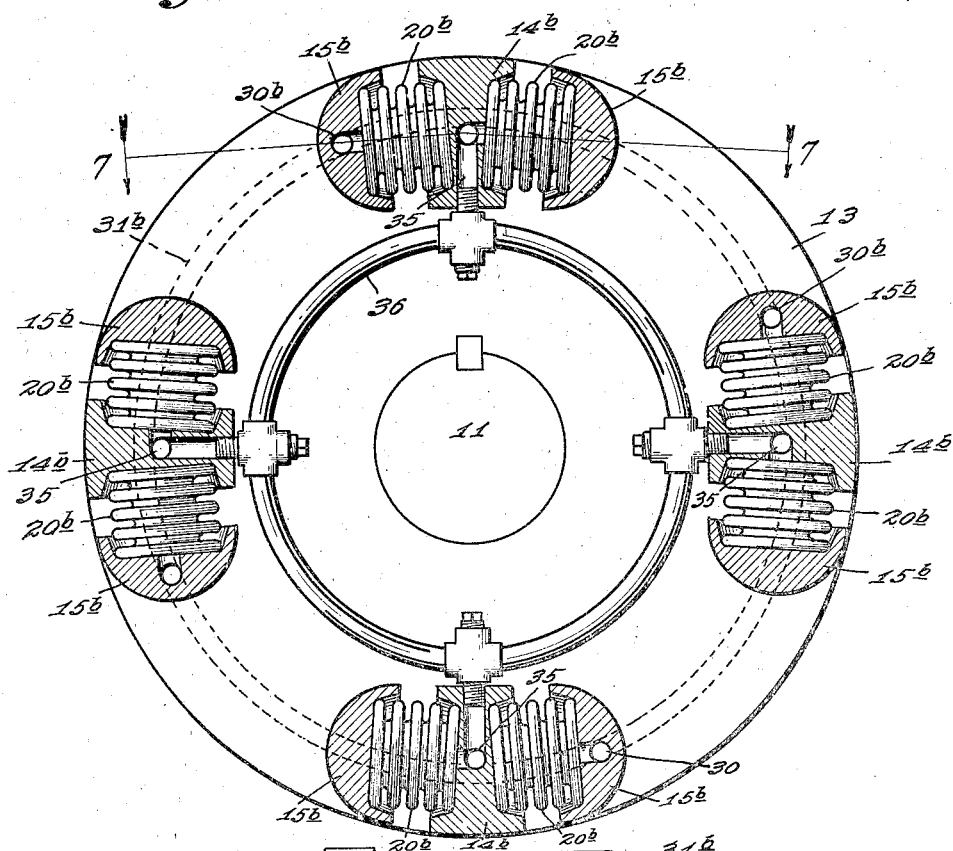
Figure 7:
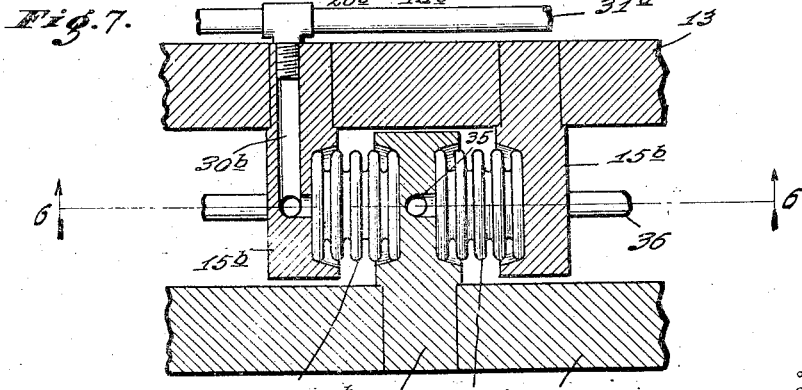

The accompanying drawings illustrate our invention. Fig. 1 is a transverse sectional view, taken substantially on the line 1—1 of Fig. 2, of one form of our invention, in which an intermediate member is provided between the two main members of the coupling; Fig. 2 is a side elevation of the form of our coupling shown in Fig. 1, as viewed from the left of Fig. 1; Fig. 3 is an enlarged sectional view substantially on the line 3—3 of Fig. 2, and is substantially a sectional enlargement of the upper part of Fig. 1; Fig. 4 is a transverse section, taken substantially on the line 4—4 of Fig. 5, of a second form of our invention, and one in which there is no intermediate member; Fig. 5 is a section substantially on the line 5—5 of Fig. 4; Fig. 6 is a larger-scale transverse section, taken substantially on the line 6—6 of Fig. 7, of a reversible coupling embodying our invention; and Fig. 7 is a detail section substantially on the line 7—7 of Fig. 6.

The two shafts 10 and 11 are the shafts which are to be interconnected by our couplings. These are or may be slightly out of line with each other, either by being at a slight angle to each other and/or by being offset slightly from each other.

On the adjacent ends of these two shafts 10 and 11 are mounted the two main coupling members 12 and 13 respectively, which are shown as disks provided with carrying hubs by which they are mounted on the shaft ends. They are shown as being keyed on the shaft ends, although that is immaterial.

The two coupling members 12 and 13 are each provided with a plurality of arms or fingers which project toward the other coupling member and overlap on a common intermediate plane. It is through these fingers or projections that power is transmitted from one coupling member to the other, and that the transmission of such power is divided into a plurality of parallel paths so that side pressures on the shafts and bearings may be avoided. Such transmission may be either direct, with interposed fluid-containing chambers, or through an intermediate coupling member which has a plurality of interposed fluid-containing chambers between it and each of the two main coupling members. These two forms of our invention will be described separately.

In the arrangement shown in Figs. 1, 2, and 3, there are fingers 14 which project from the face of the disk 12, and fingers 15 which project from the face of the disk 13. These two sets of fingers overlap each other in the intermediate plane between such two disks. The fingers 14 are equally angularly spaced, and so are the fingers 15; so that as in this instance as there are only two fingers in each set they are diametrically opposite each other. The fingers 14 and 15 do not directly co-operate in this form of our invention, but instead there is an intermediate coupling member 16, located in such intermediate plane between the two disks 12 and 13. This intermediate coupling member 16 is in the form of a cross, or of an X, with two diametrically opposite outwardly projecting fingers 18 for co-operating with the fingers 14 from the disk 12 and with two diametrically opposite outwardly projecting fingers 19 for co-operating with the two fingers 15 from the disk 13. As viewed in Fig. 1, the fingers 18 are on the counter-clockwise side of the fingers 14, but the fingers 19 are on the clockwise side of the fingers 15; so that if the shaft 10 is the driver and the shaft 11 is the driven member, and the rotation is counter-clockwise as indicated, pressure will be transmitted from the fingers 14 to the fingers 18, of the intermediate member 16, and thence from the fingers 19 to the fingers 15.

Between each pair of directly co-operating fingers, such as 14 and 18, or as 15 and 19, we provide an expansible fluid chamber, desirably in the form of a bellows unit 20. This may be seated in recesses 21, desirably tapering recesses, provided in the adjacent faces of the two co-operating fingers to prevent displacement of the bellows unit. There are four such bellows units 20 in this arrangement, one between each pair of co-operating fingers. These four bellows units are interconnected, by opening into a communicating chamber and passageway 22 provided in the intermediate member 16. By reason of this interconnection, the pressures in the various bellows units are equalized; and upon any increase or decrease in the pressure in any bellows unit there is a suitable fluid movement through the chamber and passageway 22 to cause equalization of the pressure.

As a result, when the device is in operation, power is transmitted from the driving shaft 10, through the driving disk 12, to the driving fingers 14; thence through the two bellows units co-operating with those driving fingers 14 to the fingers 18 of the intermediate coupling member 16; thence through the fingers 19 of the intermediate coupling member, and the co-operating bellows units 20, to the fingers 15 of the driven disk 13, and so to the driven shaft 11. If the shafts 10 and 11 are out of line, there is a relative movement between the fingers 14 and 18, and between the fingers 15 and 19, as the rotation of the shaft occurs. This relative movement between the co-operating fingers causes both a compression or expansion and a bending of the associated bellows units; but any change in pressure is immediately transmitted to the other bellows units, so that substantially equal pressures in the various bellows units are maintained, and the transmission of power is divided substantially equally among the various driving fingers on the one hand and among the various driven fingers on the other hand. This division of work between the different fingers is obtained by the movement of the fluid necessary to produce such equalization of pressure, which movement is usually very slight; and is obtained without any substantial mechanical movement of solid parts upon one another, and therefore substantially without any material wear of the parts. The bending of the bellows units eliminates end thrust and axial bending moments on the various coupling arms, and also makes for full seating and full surface pressures of the bellows units.

The fluid used, which is desirably a liquid such as water or oil, is chosen in accordance with the conditions to which the device may be subjected, such as the temperature. As has been stated, however, the fluid may be a gas if desired, such as compressed air; but we prefer a liquid.

The transmission of power is only in one direction of rotation, in the simple form of invention shown in Figs. 1 to 3. Therefore, to prevent undue separation of the co-operating fingers of any pair of fingers, such as the fingers 14 and 18 or the fingers 15 and 19, we preferably provide a snubbing strap 25 which extends from one finger of each pair to the co-operating finger, and comes into action if the fingers tend to separate unduly. This prevents such undue separation, and therefore protects the bellows units from destructive blows.

The ends of one or more of the arms or fingers 18 and 19 of the intermediate coupling member 16 are provided with plugged holes 26, for filling and emptying the fluid-containing chambers. Desirably there is such a plugged opening in the end of each arm of the intermediate coupling member 16, so that an upper and lower one may be opened for filling or draining purposes. As shown, each of these openings 26 may be closed by a lead gasket 27 clamped in place by a screw plug 28.

In the arrangement shown in Figs. 4 and 5, the intermediate coupling member is dispensed with. Here there are shown four driving fingers 14ª, arranged equi-angularly around the coupling; and these co-operate with four driven fingers 15ª, also equi-angularly spaced. Each driven finger 15ª lies on the counter-clockwise side of the corresponding driving finger 14ª, if the direction of rotation is counter-clockwise is indicated in Fig. 4 and the shaft 10 drives the shaft 11. Between each pair of fingers 14ª and 15ª is a bellows unit 20ª, or other expansible, compressible, and flexible fluid-containing chamber. The four bellows units 20ª are interconnected by a suitable passageway, so that the pressures within them may be equalized. As shown, this passageway is provided by holes 30 in each of the arms 14ª, which holes 30 communicate with a circular pipe 31 carried by the driving disk 12 on the opposite side thereof from the fingers 14ª.

In the form of coupling shown in Figs. 4 and 5, power is transmitted from the driving shaft 10, through the driving disk 12, to the driving fingers 14ª; thence through the various bellows units 20ª to the driven fingers 15ª; and thence through the driven disk 13 to the driven shaft 11. As relative motion occurs between any two co-operating fingers 14ª and 15ª, there is both a contraction or expansion and a bending of the associated bellows unit 20ª; but the resultant change in fluid pressure in that bellows unit is transmitted by the intercommunicating passageways 30—31 to the other bellows units 20ª, thus equalizing the pressures in all the bellows units. As a result, the various fingers 14ª and the various fingers 15ª divide substantially equally among themselves the transmission of power from the driving member to the driven member.

In this form of our invention also, the transmission of power through the bellows units 20ª is only for one direction of rotation. Therefore, to prevent undue separation of the co-operating fingers 14ª and 15ª, we desirably provide snubbing means which comes into action upon a predetermined separation. Such snubbing means is conveniently a band 25ª, which encircles each pair of co-operating fingers as indicated.

The fluid-containing passages and chambers in this form of our invention are also desirably provided with suitable filling and draining means, such as one or more plugs 28ª, as shown in Fig. 5, and the fluid used may also be either a liquid or a gas, although we prefer a liquid for the reason already indicated.

In some couplings, it is desirable that there be capability of transmitting power in either direction of rotation from the driving member to the driven member. Such a reversible-action coupling is shown in Figs. 6 and 7. In this form of coupling, as in the others, the driving and driven members 12 and 13 are in the form of disks. The driving member 12 has a plurality of fingers 14ᵇ, which are equi-angularly spaced around the disk; and each finger 14ᵇ lies between two fingers 15ᵇ projecting from the driven disk 13. Two bellows units 20ᵇ lie on opposite sides of each finger 14ᵇ, between that finger and the two fingers 15ᵇ which lie respectively on opposite sides of that finger 14ᵇ.

If the transmission of power is in a counter-clockwise direction (Fig. 6) from the driving member to the driven member, such transmission of power from the fingers 14ᵇ is to the bellows units 20ᵇ which are on the counter-clockwise side of those fingers 14ᵇ and through those bellows units to the fingers 15ᵇ with which they co-operate; while if the transmission of power is in a clockwise direction from the driving disk 12 to the driven disk 13 such transmission of power from the fingers 14ᵇ is to the bellows units which lie on the clockwise side of such fingers and through those bellows units to the fingers 15ᵇ which they engage.

All the bellows units 20ᵇ which lie on the counter-clockwise sides of the respective fingers 14ᵇ are interconnected in one hydraulic system, by passages 30ᵇ and a circular pipe 31ᵇ, and all the bellows units 20ᵇ which lie on the clockwise sides of the respective fingers 14ᵇ are interconnected in another hydraulic system, as by passages 35 and a circular pipe 36. The passages 30ᵇ are provided in the fingers 15ᵇ and disk 13; while the passages 35 are provided in the fingers 14ᵇ, and are shown as extending radially inward. Thus the two hydraulic systems for the bellows units which transmit power for different circular directions of power transmission are separate; and each serves to produce equalization of pressures in the various bellows units which are in operation at any one time by being under compression in the transmission of power.

In other words, the arrangement shown in Figs. 6 and 7 is very similar to that shown in Figs. 4 and 5, save that it is arranged to transmit power in either direction, and to equalize the pressures on the different-power-transmitting arms, instead of to transmit power and produce such equalization for only one direction of such transmission power.

We claim as our invention:

1. A flexible coupling for connecting rotary power-transmission shafts, comprising a driving member, a driven member, said driving and driven members being in general rotatable together and capable of only such movement relative to each other as is relatively small compared to a complete rotation, a plurality of variable-volume, fluid-containing chambers through which power is transmitted from one of said members to the other and which normally have a similar action simultaneously, each of which chambers transmits but part of the entire power to be transmitted, and passages interconnecting said various fluid-containing chambers to equalize the fluid pressure within them.

2. A flexible coupling for connecting rotary power-transmission shafts, comprising a driving member, a driven member, said driving and driven members being in general rotatable together and capable of only such movement relative to each other as is relatively small compared to a complete rotation, a plurality of variable-volume fluid-containing chambers through which power is transmitted from one of said members to the other and which normally have a similar action simultaneously, and passages interconnecting said various fluid-containing chambers to equalize the fluid pressure within them.

3. A flexible coupling for connecting rotary power-transmission shafts, comprising two main coupling members, a plurality of compressible and flexible fluid-containing units through which power is transmitted in parallel from one of said coupling parts to the other, said units being interconnected so that the fluid pressures in them are equalized.

4. A flexible coupling for connecting rotary power-transmission shafts, comprising two main coupling members, each member being provided with a plurality of power-transmitting projections substantially equi-angularly spaced, flexible fluid-pressure units co-operating with the various projections to transmit power therefrom or thereto, and means for interconnecting such units to equalize the fluid pressures in them.

5. A flexible coupling for connecting rotary power-transmission shafts, comprising two main coupling members, each provided with projections, compressible, expansible, and flexible fluid-containing chambers co-operating with said projections, and passages interconnecting the various fluid-containing chambers.

6. A flexible coupling for connecting rotary power-transmission shafts, comprising two main coupling members, each provided with projections, a plurality of compressible and expansible fluid-containing chambers co-operating with said projections and normally having simultaneously a similar action, and passages interconnecting the various fluid-containing chambers.

7. A flexible coupling for connecting rotary power-transmission shafts, comprising a driving member, and a driven member, said two members being provided with a plurality of pairs of co-operating projections through which power is transmitted from one of said members to the other, one of the projections of each pair being on each of said members, said members also being provided with a fluid-confining chamber having flexible and compressible parts acting between the projections of the various pairs of projections and containing a fluid through which pressure is transmitted from one of said members to the other and by which the pressure between the projections of the several pairs of projections is equalized.

8. A flexible coupling for connecting rotary power-transmission shafts, comprising a driving member, a driven member, each of said members having a plurality of projections through which it transmits power to or receives power from corresponding projections of the other member, and fluid-containing means which is interposed in the driving train between the projections of the two members and which confines a single body of fluid which transmits pressure between the projections of one member and those of the other and equalizes the pressure transmitted by the various projections.

9. A flexible coupling for connecting rotary power-transmission shafts, comprising a driving member, a driven member, each of said members having a plurality of projections through which it transmits power to or receives power from corresponding projections of the other member, and fluid-containing means which is interposed in the driving train between the projections of the two members and which confines a single body of fluid which transmits pressure between the projections of one member and those of the other and equalizes the pressure transmitted by the various projections and which is put under pressure in proportion to the pressure transmitted between the two members.

10. A flexible coupling for connecting rotary power-transmission shafts, comprising a driving member, a driven member, a plurality of variable-volume fluid-containing chambers through which power is transmitted in parallel from one of said members to the other, and permanently open passages interconnecting said various fluid-containing chambers to equalize the pressure within them.

In witness whereof, we have hereunto set our hands at Connersville, Fayette County, Indiana, this 6th day of July, A. D. one thousand nine hundred and twenty eight.

JOHN T. WILKIN.
CLARENCE B. COLDWELL.